Feb. 7, 1956 H. G. ADLER 2,733,690
HYDRAULIC GOVERNOR AND PRESSURE REGULATING VALVE STRUCTURE
Filed Oct. 30, 1952
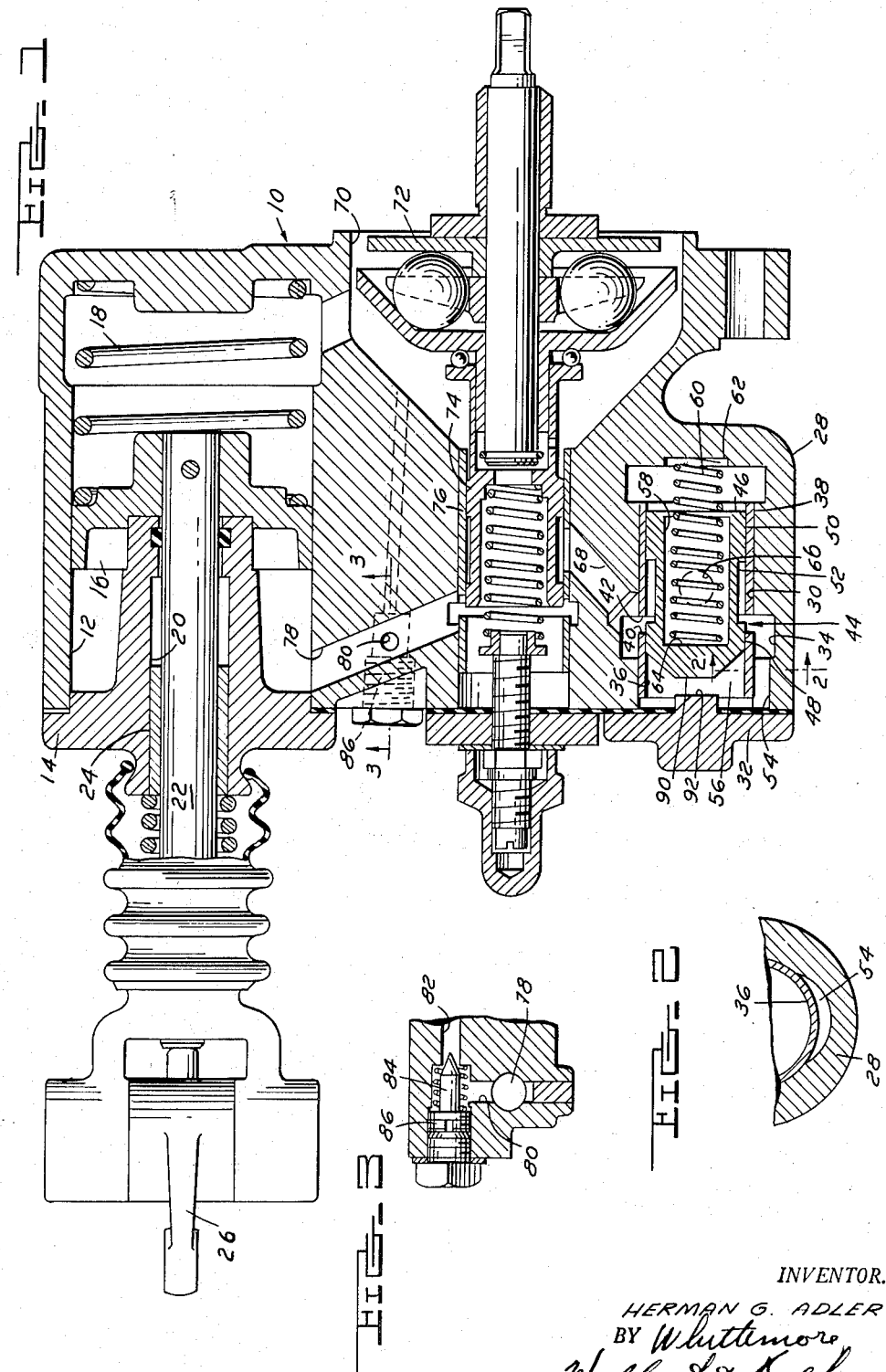
INVENTOR.
HERMAN G. ADLER
BY Whittemore,
Hulbert & Belknap
ATTORNEYS United States Patent Office 2,733,690
Patented Feb. 7, 1956

2,733,690

HYDRAULIC GOVERNOR AND PRESSURE REGULATING VALVE STRUCTURE

Herman G. Adler, Detroit, Mich., assignor to Novi Equipment Company, Novi, Mich., a corporation of Michigan Application October 30, 1952, Serial No. 317,707

4 Claims. (Cl. 121—43)

The present invention relates to a hydraulic governor and pressure regulating valve structure.

It is an object of the present invention to provide a speed responsive hydraulic engine governor including means for supplying oil for control of the governor at a regulated pressure.

It is a further object of the present invention to provide a self-contained governor structure which includes a pressure regulator, a hydraulic device for regulating engine speed, and centrifugal speed responsive means for controlling operation of the hydraulic device.

It is a further object of the present invention to provide in an engine governor, a speed regulator which comprises pressure regulating valve structure adapted to maintain outlet pressure substantially constant.

It is a further object of the present invention to provide a speed regulator including a movable pressure regulating valve, and means associated with said valve for insuring substantial initial movement of the valve to free the valve for subsequent delicate pressure regulation.

Other objects and features of the invention will become apparent as the description proceeds, especially when taken in conjunction with the accompanying drawings, wherein:

Figure 1 is a side elevation, mainly in section of the engine governor.

Figure 2 is an enlarged fragmentary sectional view on the line 2—2, Figure 1.

Figure 3 is a section on the line 3—3, Figure 1.

Referring now to the drawings, the governor comprises a main casting 10 having a generally cylindrical recess 12 therein closed by a removable cap 14 and containing a piston 16. At one side of the piston 16 is a compression spring 18 which seats against the inner end of the cylinder and bears against the piston. The cap 14 has an opening 20 therethrough which receives the piston rod 22, suitable sealing and guide means for the piston rod being indicated at 24. The outer end of the piston rod 22 is connected to a lever 26 which is appropriately connected to the throttle of an internal combustion engine. For a detailed disclosure of the connections between the piston rod 22 and the lever 26 reference is made to my prior copending application Serial No. 222,336, filed April 23, 1951.

The present governor is designed to operate from lubricating oil supplied under pressure by the usual oil pump provided on the governed engine. In order to maintain uniform operating characteristics for the governor throughout possible wide changes in pressure of the lubricating oil, means are provided in the present governor for regulating oil pressure at a value for which the governor is designed.

The pressure regulating mechanism is built into the main casting 10 of the governor, the casting being provided with a projecting portion 28 having a generally cylindrical recess 30 formed therein. The recess 30 is adapted to be closed at its otherwise open end by a removable cap 32. Located intermediate the ends of the cylinder 30 is a lateral annular enlargement 34 which forms an annular chamber. A pair of cylindrical sleeves 36 and 38 are provided in the cylinder 30, the sleeves 36 and 38 being axially aligned and spaced apart such that their adjacent end surfaces 40 and 42 respectively define an annular port 44.

Located within the sleeves 36 and 38 is a spool valve 46 having lands 48 and 50 slidable respectively in the sleeves 36 and 38. The valve 46 is provided with a reduced portion 52 intermediate the lands 48 and 50. A passage 54 is provided in the body which as best seen in Figure 2, is lune shaped. The passage 54 communicates with a closed space 56 so that the pressure of fluid in the annular chamber 34 is effective on the left hand end of the valve 46, as seen in Figure 1.

The valve 46 has a recess 58 open at one end and extending substantially the entire length of the valve. A pressure regulating spring 60 is provided, the main portion of which is received within the recess 58. The ends of the spring seat respectively at the right hand end of the cylinder, as seen in Figure 1, and at the closed end of the recess 58 in the valve. The right hand end of the cylinder 30 is provided with a shallow seat 62 and a similar seat 64 is provided at the inner closed end of the valve. By this construction the spring 60 is prevented from buckling and accordingly, a relatively long spring may be employed which is desirable for pressure regulation.

Hydraulic fluid is supplied through an inlet opening 66 which extends from the exterior of the casting 10 into the space between the intermediate reduced portion 52 of the valve and the adjacent inner surface of the sleeve 38. An outlet passage 68 connects the chamber 34 to speed responsive control valve mechanism which will now be described.

The casting 10 includes an open recess 70 in which is received centrifugal mechanism indicated generally at 72, which may be of the type disclosed in my prior copending application referred to above. Operatively connected to the centrifugal mechanism 72 is a spool valve 74 slidable in a sleeve 76 and adapted to control the flow of fluid from the passage 68 to a passage 78 which communicates with the cylinder 12 intermediate the piston 16 and the cap 14. Details of the valve mechanism may be as disclosed in my prior copending application identified above.

Extending from the passage 78 is a small bleed passage 80 which as best seen in Figure 3, communicates with a second passage 82 which is provided with a needle valve 84 adapted to be adjusted by an adjusting screw 86 to control leakage flow of fluid. The purpose of this is to insure a relatively small but definite flow of oil through the governor at all times.

Referring again to Figure 1 it will be observed that the left hand end of the valve 46 has a flat end surface 90, and the removable cap 32 is provided with an abutment 92, the end of which has an area adapted to fit in surface-to-surface contact with the flat end surface 90 of the valve. The abutment 92 is designed to limit movement of the valve to the left as seen in Figure 1, to a position such that the inner edge of the land 48 coincides with the edge 40 of the sleeve 36. In other words, when the valve is in the extreme left hand position, as seen in Figure 1, its end surface 90 engages the abutment 92, and the annular port 44 is in fully open position. In addition, the provision of the cooperating surfaces at the end of the valve and on the abutment 92 serve an additional function. When the engine is initially started, the valve 46 will be in the extreme left hand position due to the action of the spring 60. At this time the engine may have been idle for some time or lubricating oil may have somewhat congealed or stiffened. As the pressure of the lubricating oil builds up, the pressure applied to the valve in the space 56 is applied to less than the entire end area of the valve, due to the surface-to-surface contact between the area 90 on the valve and the cooperating surface of the abutment 92. For this purpose, of course, surfaces 90 and 92 are accurately finished to prevent entrance of pressure fluid therebetween. Thus, the pressure required to overcome the spring 60 will exceed the desired regulated pressure by a definite amount. In the example illustrated the area of the surface 90 constitutes approximately one-eighth of the entire area at the end of the piston, and accordingly the pressure initially required to overcome the spring 60 will be from ten to twelve percent above the desired regulating pressure. Upon the first slight movement of the valve 46, this pressure will be effective to move the valve abruptly and will thus free the valve for subsequent movement. The action may be likened to mechanically moving the valve 46 to free the valve for subsequent automatic operation.

In addition to the foregoing, this last arrangement provides oil to the governing mechanism at a pressure somewhat in excess of the normal governed pressure upon initial starting of the engine and in some cases this additional pressure may be advantageous in preventing running the engine up to an excessive speed upon first starting the engine.

The drawings and the foregoing specification constitute a description of the improved hydraulic governor and pressure regulating valve structure in such full, clear concise and exact terms as to enable any person skilled in the art to practice the invention, the scope of which is indicated by the appended claims.

What I claim as my invention is:

1. A hydraulic motor adapted to be connected to the throttle of an engine, a source of hydraulic fluid under variable pressure, passage means connecting said source to said motor, a speed responsive device adapted to be operatively connected to the engine including a valve for controlling the flow of hydraulic fluid between said source and said motor, a pressure regulating valve intermediate said source and the valve of said speed responsive device effective to open said passage means, when said source is inoperative, to regulate the pressure of hydraulic fluid supplied to the valve of said speed responsive device during operation of the engine at a predetermined substantially uniform regulated pressure and to provide for substantially unrestricted flow of hydraulic fluid to the valve of said speed responsive device upon initial supply of hydraulic fluid under pressure until pressure between said source and said pressure regulating valve exceeds said predetermined regulated pressure by a substantial amount, said pressure regulating valve comprising a cylinder, a piston valve slidable longitudinally in said cylinder, means closing one end of said cylinder, an abutment at the closed end of said cylinder engageable by said piston valve, a spring urging said valve toward the closed end of said cylinder, said cylinder and piston valve comprising a pressure regulating valve port adapted to be substantially fully open when said piston valve is in engagement with said abutment, said abutment and the adjacent end of said piston valve having accurately fitted engaging surfaces of substantial area but substantially less area than the entire projected end area of said piston valve, a passage connecting the space between the closed end of said cylinder and the adjacent end of said piston valve to the passage means intermediate said pressure regulating valve and the valve of said speed responsive device to initiate closing movement of said piston valve following starting said engine only after fluid applied to the valve of said speed regulating device has exceeded the predetermined regulated pressure by a definite substantial amount, the accurately fitted abutment engaging surface at the end of said piston valve adjacent the closed end of said cylinder being located centrally thereof, and the surrounding area thereof being exposed to hydraulic fluid when said piston valve is engaged with said abutment.

2. Apparatus as defined in claim 1 in which said piston valve is elongated and tubular and provided with an end closure at the end thereof adjacent the closed end of said cylinder, and said spring is an elongated helical spring the major portion of which is received within said piston valve.

3. A pressure regulating valve effective to regulate a variable pressure supply of hydraulic fluid at a substantially constant regulated pressure during operation and to supply pressure fluid at a substantially higher pressure than said regulated pressure when pressure fluid is initially supplied to said valve, said valve comprising a cylinder, a piston valve slidable longitudinally in said cylinder, means closing one end of said cylinder, an abutment at the closed end of said cylinder engageable by said piston valve, a spring urging said valve toward the closed end of said cylinder, said cylinder and piston valve comprising a pressure regulating valve port adapted to be substantially fully open when said piston valve is in engagement with said abutment, said abutment and the adjacent end of said piston valve having accurately fitted engaging surfaces of substantial area but substantially less area than the entire projected end area of said piston valve, a passage connecting the space between the closed end of said cylinder and the adjacent end of said piston valve to the discharge side of said valve to initiate closing movement of said piston valve following initial supply of pressure fluid to said valve only after the pressure at the discharge side of said valve has exceeded said regulated pressure by a substantial amount, the accurately fitted abutment engaging surface at the end of said piston valve adjacent the closed end of said cylinder being located centrally thereof, and the surrounding area thereof being exposed to hydraulic fluid when said piston valve is engaged with said abutment.

4. Apparatus as defined in claim 3 in which said piston valve is elongated and tubular and provided with an end closure at the end thereof adjacent the closed end of said cylinder, and said spring is an elongated helical spring the major portion of which is received within said piston valve.

References Cited in the file of this patent

UNITED STATES PATENTS

| Number | Name | Date |
|---|---|---|
| 913,853 | Rowntree | Mar. 2, 1909 |
| 1,320,845 | Dayton | Nov. 4, 1919 |
| 2,059,808 | Robart et al. | Nov. 3, 1936 |
| 2,292,805 | Tippen | Aug. 11, 1942 |
| 2,373,684 | Holloway | Apr. 17, 1945 |
| 2,401,397 | Wright | June 4, 1946 |
| 2,468,079 | Kirkham | Apr. 26, 1949 |
| 2,493,111 | Courtot | Jan. 3, 1950 |
| 2,561,588 | Muzzey et al. | July 24, 1951 |
| 2,571,842 | Dale | Oct. 16, 1951 |